(12) United States Patent
Slawinski et al.

(10) Patent No.: US 7,137,406 B2
(45) Date of Patent: Nov. 21, 2006

(54) SELF-CLEANING FILTER

(75) Inventors: Tomasz Slawinski, Northbrook, IL (US); Valeriy Kazak, Des Plaines, IL (US)

(73) Assignee: HydraForce, Inc., Lincolnshire, IL (US)

( * ) Notice: Subject to any disclaimer, the term of this patent is extended or adjusted under 35 U.S.C. 154(b) by 450 days.

(21) Appl. No.: 10/717,003

(22) Filed: Nov. 19, 2003

(65) Prior Publication Data

US 2004/0108001 A1 Jun. 10, 2004

Related U.S. Application Data

(60) Provisional application No. 60/427,483, filed on Nov. 19, 2002.

(51) Int. Cl.
*B01D 29/00* (2006.01)
*F16K 31/40* (2006.01)

(52) U.S. Cl. .................. 137/544; 251/30.01; 251/33

(58) Field of Classification Search ............... 137/544; 251/30.01, 33, 38; 138/40
See application file for complete search history.

(56) References Cited

U.S. PATENT DOCUMENTS

| 1,633,217 | A | * | 6/1927 | Littlefield ............... 251/30.03 |
| 3,100,103 | A | * | 8/1963 | Bullard .................. 251/30.03 |
| 3,806,036 | A | | 4/1974 | Olson |
| 4,679,765 | A | * | 7/1987 | Kramer et al. ............ 251/38 |
| 4,779,571 | A | | 10/1988 | Row |
| 4,794,890 | A | | 1/1989 | Richeson, Jr. |
| 4,799,645 | A | * | 1/1989 | Kramer et al. ........... 251/30.04 |
| 5,522,421 | A | | 6/1996 | Holt et al. |
| 5,560,825 | A | | 10/1996 | Shafer |
| 5,913,332 | A | | 6/1999 | Fulford |
| 6,021,999 | A | | 2/2000 | English et al. |
| 6,267,350 | B1 | | 7/2001 | Slawinski |

FOREIGN PATENT DOCUMENTS

| GB | 1 466 022 | 3/1977 |
| GB | 2 200 726 A | 8/1988 |

* cited by examiner

*Primary Examiner*—John Rivell
(74) *Attorney, Agent, or Firm*—Leydig, Voit & Mayer, Ltd

(57) ABSTRACT

A self-cleaning filter for use in a valve is disclosed. The valve can include a bore, an orifice disposed in the bore for accommodating a fluid flow therethrough, and a filter disposed in the bore between the input port of the fluid flow being filtered and the orifice being protected. The filter can include an entrance head in predetermined spaced relationship with the bore of the valve to define a filter entrance and a body portion. The entrance head can be configured to prevent particles of a predetermined size from entering the filter entrance. The body portion can include at least a portion that has a different shape than the entrance head which cooperates with the bore to define a fluid passage. The fluid passage can have an exit port which is communicable with the orifice to send filtered fluid to the orifice. The filter can include an offset portion which extends beyond an end face of the bore which is useful to develop pressure gradients which provide for a self-cleaning function. In some embodiments, the filter can include an integral orifice.

27 Claims, 10 Drawing Sheets

SELF-CLEANING FILTER

CROSS-REFERENCE TO RELATED PATENT APPLICATIONS

This patent application claims the benefit of priority to U.S. Provisional Application No. 60/427,483, filed Nov. 19, 2002, entitled "Self Cleaning Filter," which is incorporated in its entirety herein by this reference.

FIELD OF THE INVENTION

The present invention relates generally to hydraulic valves, and, more particularly, to valves with small flow passages that require protection from contaminate particles carried by fluid.

BACKGROUND OF THE INVENTION

Hard small particles, collectively called "contamination," are among the most frequent cause of failures in typical hydraulic systems. Contamination is carried by the fluid flowing through the hydraulic system, penetrating virtually every flow passage. To combat this problem, a typical hydraulic system is equipped with a replaceable low-pressure filter that is usually located in the return-to-tank line at the end of the entire hydraulic circuit. The filter's role is to separate and store the maximum possible amount of contamination over multiple passes of the fluid.

Most hydraulic systems use hydraulic valves to control flow parameters and to steer the various flows in desired directions. Their need for precision and tight clearances can make hydraulic valves very sensitive to contamination. So called "two-stage valves" are particularly sensitive to contamination. A two-stage valve is a valve in which the main element is controlled by a smaller flow, called a "pilot flow." Small flows, such as pilot flows, are typically created by limiting the flow of fluid through a small orifice. If the orifice is exposed to contamination, then the particles that make up the contamination may not pass through and, eventually, may block the orifice. A blocked orifice is a common cause of valve failure or hydraulic system failure.

Most two-stage, or piloted, valves have an additional small filter built inside the valve to protect the pilot flow orifice from blocking. Existing "in-valve" filters are not very effective, however. In most cases, after being exposed to a contaminated fluid an in-valve filter has to be factory cleaned, which involves removing and rebuilding the entire valve. Furthermore, existing in-valve filters tend to be expensive.

Filters that are used for inner passage fluid filtration in high and low pressure hydraulic applications typically operate on a separation by restriction and storage principle. In such filters, fluid is passed through multiple small openings of a filter that is installed in front of an orifice. These filters are usually made from a metal screen or perforated material, and are classified by their percentage of open area.

In general, the more open area a filter has, the better it tends to be. However, in some applications, filters with large open areas are not practical because of space constraints. For applications that are space sensitive, small yet highly open filters may be used. However, the latter type of filter has its own drawbacks, which are most evident in high-pressure applications. One drawback is that the filter element is structurally weak and requires additional support to withstand differential pressure force when the filter is clogged with debris. Another drawback of small, highly open filters is that they tend to permit large particles to enter.

SUMMARY OF THE INVENTION

The invention provides an effective and durable filter for two-stage hydraulic valves. The invention may also be usefully applied in other types of valves or in other types of devices when cleanliness of the fluid is desired and space is limited.

In a two-stage valve, a small flow called a pilot flow can be used to control the main stage. The pilot flow passes through an orifice and is preferably relatively free of foreign matter. According to an embodiment of the invention, a filter is used to ensure that this pilot flow is substantially free of foreign matter. The filter has at least one continuous or two separate geometric features that create a controlled fluid passage. Elements of the filter are in fixed positions with respect to one another within predefined distances or clearances.

Additionally, a surface of the filter can be offset from an adjacent surface, thereby defining a small step. The step can be oriented in the same direction as the flow of the fluid that is being filtered. The clearances can be configured in such a way that, in at least one dimension, the width of the entrance opening through which the fluid passes is smaller than the smallest contaminant size that the filter is desired to filter.

In one embodiment of the invention, a filter for a valve including a bore for receiving the filter and an orifice for accommodating a fluid flow therethrough is provided. The filter includes an entrance head configured to be in predetermined spaced relationship with the bore of the valve when disposed therein to define a filter entrance. The filter entrance can be sized to prevent particles of a predetermined size from entering the filter entrance. The filter can also include a body portion cooperating with the bore to define a fluid passage, which has an exit port communicable with the orifice.

The entrance of the filter can be placed in a flow passage where there is a relatively large flow of fluid. This large flow can move in a direction different than that of the fluid being filtered. In various embodiments, the large flow moves in a direction that is substantially perpendicular to the small step. The channel through which the large flow travels can bypass the filter and be directed to a discharge line, which can contain a replaceable low-pressure main system filter.

In an embodiment of the invention, the filter can be self-cleaning and can block contaminate particles that are, at their smallest dimension, larger than the opening of the filter. The filtered particles that are stopped at the entrance eventually build up, causing the filter entrance to become partially covered. The large flow referred to above (also called a "cross flow") can flow in a direction different than the flow being filtered, thereby causing large gradients of pressure in the area of the small step where filtered particles are stored. The pressure gradients suck the stored particles into the large flow. The particles can then be carried toward the discharge line where they can be trapped by the low-pressure main system filter.

In yet another embodiment of the invention, a self-cleaning filter for a valve including a bore for receiving the filter and an orifice for accommodating a first fluid flow therethrough can be provided. The filter can include an entrance head configured to be in predetermined spaced relationship with the bore of the valve when disposed therein to define a filter entrance. The filter entrance can be sized to prevent particles of a predetermined size from entering the filter entrance. The entrance head can be configured to project beyond an end of the bore to define an offset portion of the entrance head. The filter can also include a body portion cooperating with the bore to define a fluid passage, which has an exit port communicable with the orifice. When a second fluid flow, which moves in a direction different than the first fluid flow, acts upon the offset portion, a pressure gradient develops such that any particles trapped in the filter entrance are urged to move out of the filter entrance into the second fluid flow.

In another embodiment of the invention, a valve is provided which can include an input port for connection to a pressure source to develop a fluid flow, a bore in communication with the input port, an orifice disposed in the bore for accommodating the fluid flow therethrough, and a filter disposed in the bore. The filter can include an entrance head and a body portion. The entrance head can be in predetermined spaced relationship with the bore of the valve to define a filter entrance, which can be configured to prevent particles of a predetermined size in the fluid flow from entering the filter entrance. The body portion can cooperate with the bore to define a fluid passage, which has an exit port communicable with the orifice.

These and other features of the present invention will become apparent to one of ordinary skill in the art upon reading the detailed description, in conjunction with the accompanying drawings. In these descriptions, the terms "top," "bottom," "upper," "lower," and the like are used solely for convenient reference and should not be construed as limiting because in practice the control valve and the filter may be oriented omnidirectionally. Terms such as "enlarged" are provided to differentiate one figure from another but should not be construed as limiting the size of any product made in accordance with the invention.

DETAILED DESCRIPTION OF PREFERRED EMBODIMENTS OF THE INVENTION

Figure 1:
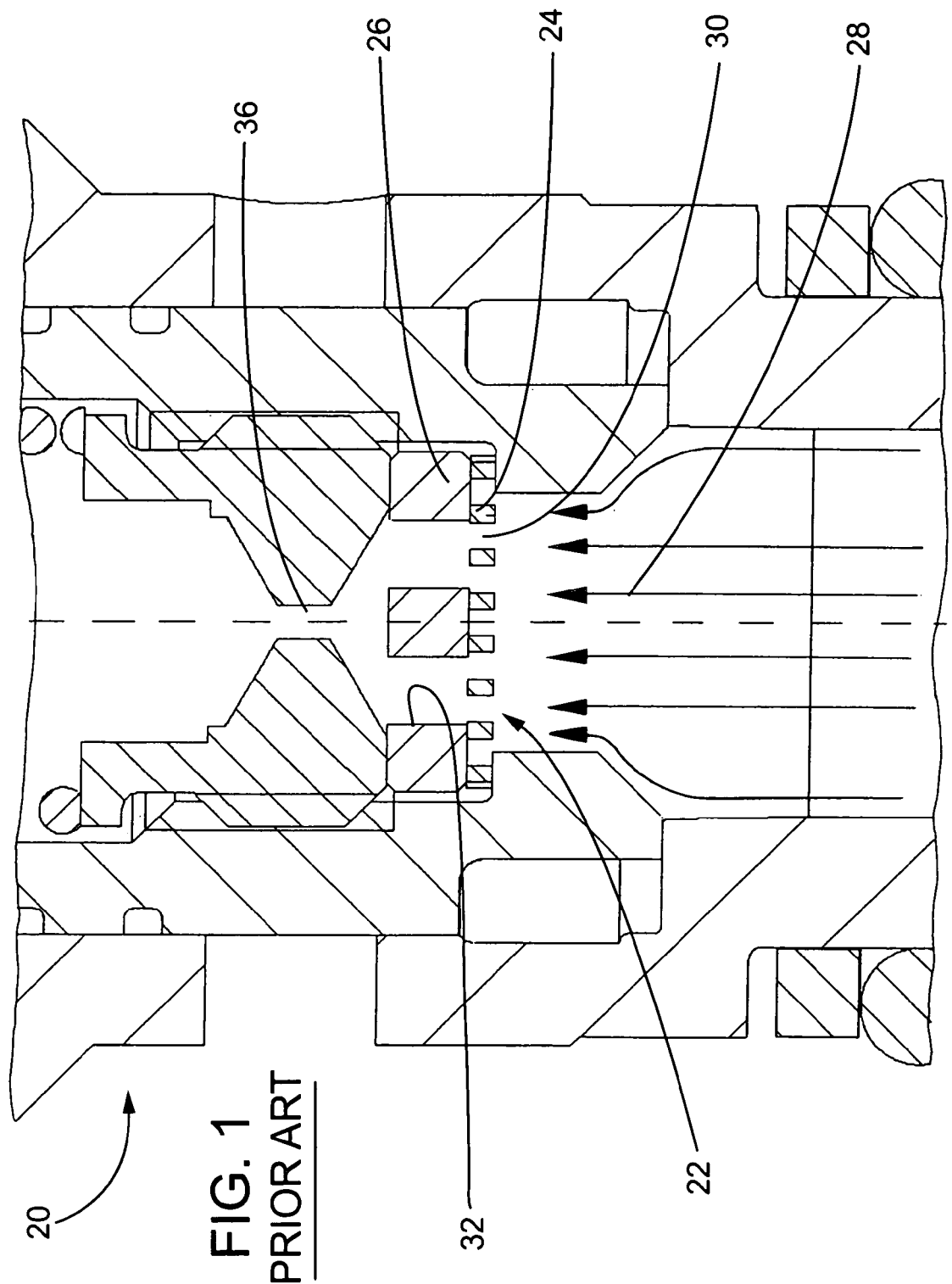
FIG. 1 is a sectional view of a prior art valve including a filter with a perforated screen disk.

Referring to FIG. 1, a typical prior art valve 20 is shown. The valve 20 includes a filter assembly 22 with a perforated screen disk 24 and an additional support disk 26. A flow 28 of fluid entering the filter assembly 22 can pass through a plurality of passage openings 30 in the screen disk 24 and openings 32 of the support disk 26, which are relatively larger than the passage openings 30 of the screen disk 24, to a pilot orifice 36.

Figure 2:
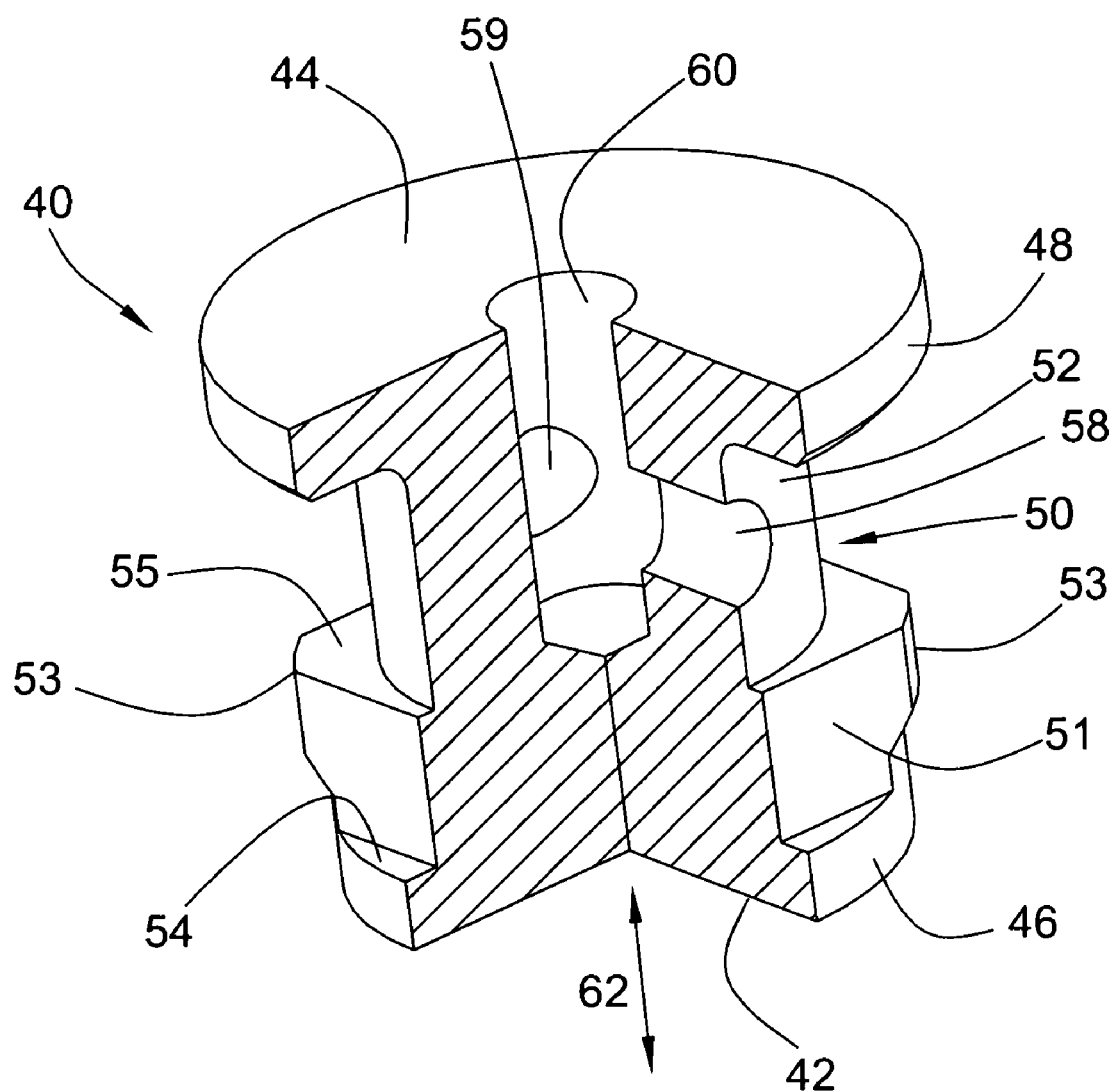
FIG. 2 is a perspective view, partially in section, of an embodiment of a filter according to the present invention.

Referring to FIG. 2, an embodiment of a filter 40 according to the present invention is shown. The filter 40 is generally cylindrical. The filter 40 can include an entrance end 42 and an exit end 44 with the entrance end having an entrance head in the form of a passage flange 46 and the exit end having a mounting flange 48. The flanges 46, 48 are generally circular. A body portion 50 of the filter includes first and second sections 51, 52 which have different shapes from each other. The first section 51 is generally square-shaped, including rounded corners 53. The rounded corners 53 can have a radius that substantially conforms to the radius of a bore in which the filter is intended to be disposed. The rounded corners 53 of the first section can project beyond the perimeter of the passage flange 46.

The passage flange 46 and the first section 51 define a first step 54, and the first section 51 and the second section 52 define a second step 55. A pair of cross holes 58, 59 is disposed in the second section 52 and is in communication with an exit port 60 which opens to the exit end 44 of the filter. The cross holes 58, 59 are in opposing relationship with each other. The exit port extends along a central axis 62 of the filter 40 for a predetermined distance from the exit end toward the entrance end 42. The cross holes 58, 59 are substantially perpendicular to the exit port 60. The filter 40 can be made from any suitable material, such as aluminum, stainless steel, or plastic, for example, and is preferably made from low carbon steel. The filter can be made by any suitable method, such as by machining or by injection molding, for example.

Figure 3:
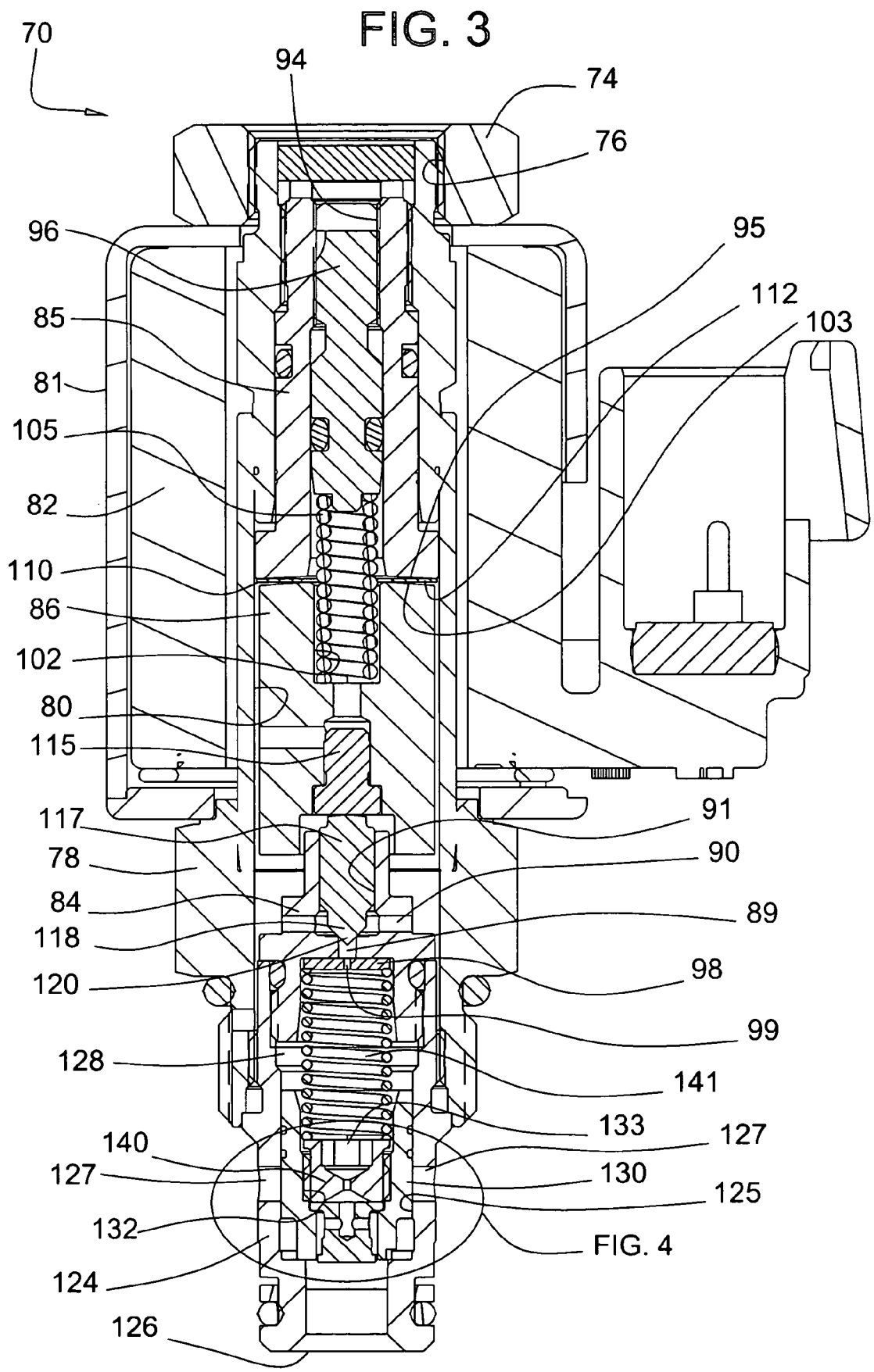
FIG. 3 is a sectional view of an embodiment of a valve according to the present invention, including the filter of FIG. 2 and showing the valve in a closed position.

Referring to FIG. 3, an embodiment of a control valve 70 according to the invention is shown in a closed position. The control valve 70 includes a retainer 74, having a generally cylindrical bore 76, and an actuator tube 78, having a generally cylindrical bore 80. The retainer 74 is mounted to the actuator tube 78, a portion of which is disposed within the bore 76 of the retainer. The control valve 70 further includes a coil frame 81 containing a coil 82 circumferentially mounted on the actuator tube 78, an upper housing 84, a pole piece 85, and an armature or plunger 86. The upper housing 84 is fixed within the bore 80 of the actuator tube and can include a generally cylindrical passageway 89, a generally cylindrical passageway or pilot tank connection 90, and a generally cylindrical bore 91. The pole piece 85 is fixed within the actuator tube bore 80 and has a generally cylindrical bore 94 and a downwardly facing surface 95. A spring adjuster 96 is seated within the bore 94. A plate 98 having a pilot hole 99 is fixed at the opening of the passageway 89 so that the pilot hole 99 communicates therewith.

The armature 86 is slidably disposed within the bore 80 of the actuator tube 78 adjacent the spring adjuster 96. The armature 86 has a generally cylindrical bore 102 and an upwardly facing surface 103. A spring 105 is disposed within pole piece bore 94 and the armature bore 102. The spring 105 abuts the spring adjuster 96 and the armature 86 to provide a biasing force against the armature 86.

A gap 110 is defined by the surfaces 95, 103 of the pole piece 85 and the armature 86, respectively. The gap 110 has a generally frustoconical shape and extends around the perimeter of the spring 105. A flexible, non-magnetic washer 112 is disposed within the gap 110. The washer 112 has a hole, through which the spring 105 extends, and is generally planar. While the gap 110 may have a variety of useful configurations, preferably the surfaces 95, 103 have a slope of approximately 6 to 9 degrees with the tip of the frusto-conical gap 110 oriented toward the retainer 74 and the base oriented toward the upper housing 84. The washer 112 is preferably brass, but may be bronze, plastic, stainless steel, or any other non-magnetic material with spring-like characteristics. The washer 112 can be similar in other respects to a washer as shown and described in U.S. Pat. No. 6,267,350, which is incorporated herein in its entirety by this reference.

Referring to FIG. 3, a rigid member 115 is disposed within the armature 86. A control member or poppet 117 is slidably disposed in the bore 91 of the upper housing and abuts the rigid member 115. The poppet 117 has a head 118 with a circumference that is smaller than that of the bore 91. The head 118 has a tip 120 that is seated in the passageway 89 of the upper housing when the valve 70 is in a closed position, as shown in FIG. 3.

The valve 70 further includes a lower housing or cage 124 having a generally cylindrical bore 125, an inlet port 126, discharge ports 127, and a chamber 128. A spool 130 is slidably arranged in the bore 125 of the lower housing. The spool 130 has a generally cylindrical bore 132 and a chamber 133. An orifice insert 140 can be disposed in the bore 132 of the spool and threadedly engaged therewith to retain the orifice insert 140 in fixed relation to the spool 130. A spring 141 is disposed in the chamber 128 of the lower housing with its upper end abutting the plate 98 and its lower end contacting the orifice insert 140 in the bore 132 of the spool.

Figure 4:
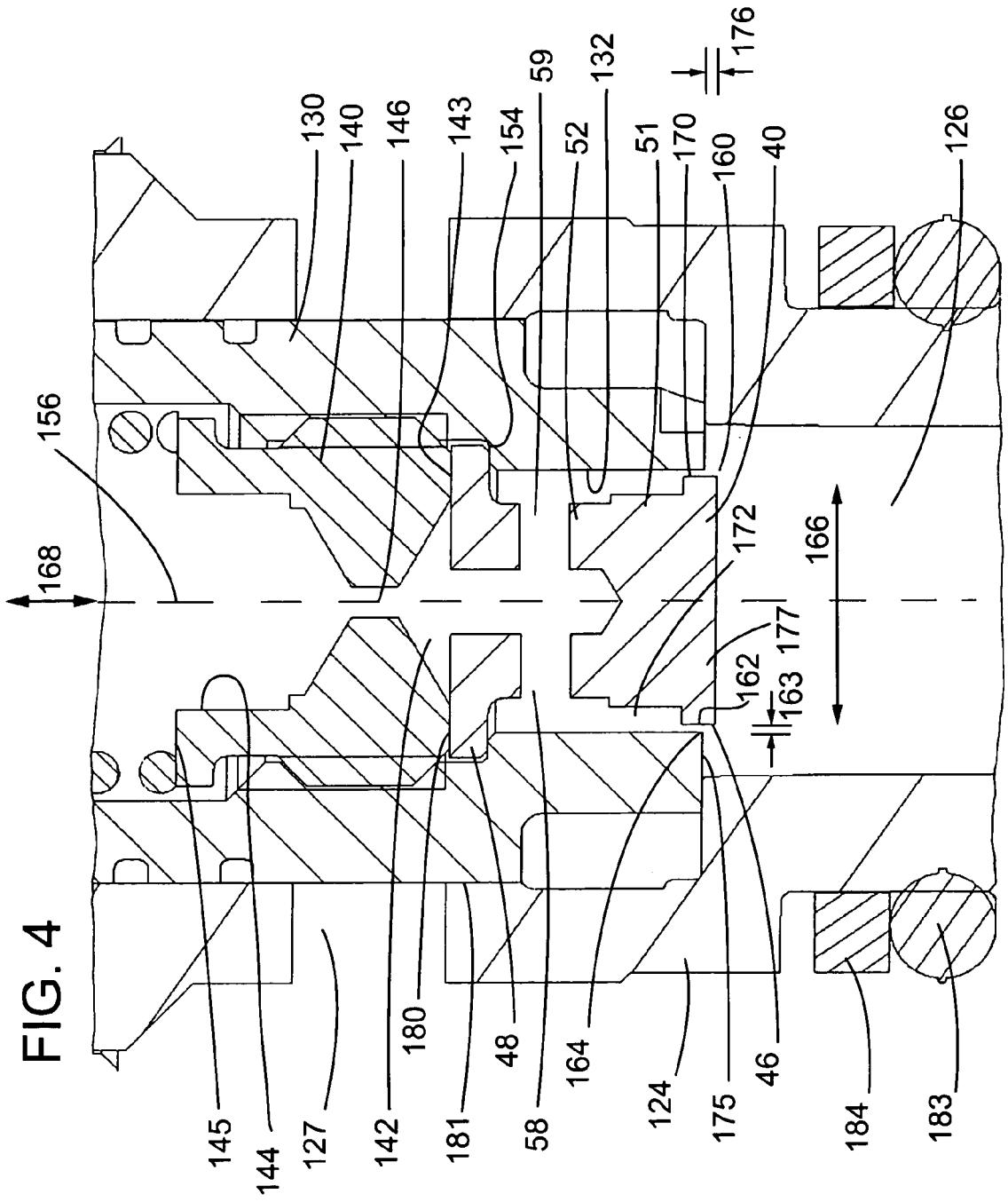
FIG. 4 is an enlarged detail view taken from FIG. 3, showing the filter of FIG. 2 operably arranged to filter fluid entering an orifice.

Referring to FIG. 4, the orifice insert 140 can include an inlet 142 disposed in an inlet end 143 of the insert, an outlet 144 disposed in an outlet end 145 thereof, and an orifice 146 therebetween such that communication is established between the inlet 142 and the outlet 144 via the orifice 146.

Referring to FIG. 4, the filter 40 of FIG. 2 is disposed in the bore 132 of the spool. The mounting flange 48 of the filter is disposed between the inlet end 143 of the orifice insert 140 and a shoulder 154 of the spool 130 to thereby retain the filter 40 in fixed relation relative to the spool 130.

The filter 40 is disposed in operable arrangement with the orifice 146 to filter contaminants from the pilot flow 156. The filter 40 is disposed between the inlet port 126 and the orifice 146. The passage flange 46 of the filter 40 and the spool 130 define a filter entrance 160, which is generally annular. The first section 51 of the filter can engage the bore 132 of the spool with the rounded corners in contacting relation with the spool to act to dispose the filter 40 in substantially concentric relationship with the spool 130.

A side wall 162 of the passage flange 46 is disposed a predetermined opening distance 163 from a surface 164 of the bore 132 of the spool. The opening distance 163 is measured along a transverse axis 166 of the valve, which is substantially perpendicular to a longitudinal axis 168 thereof. The filter 40 can prevent contaminates that are larger than the opening distance 163 from passing between the passage flange 46 and the spool 130 to thereby filter particles larger than a predetermined size. The opening distance 163 (and thus the filter size) can be any desired value, such as any value between about 0.004 and about 0.006 inches, for example.

A portion of the side wall 162 of the filter 40 overlaps the surface 164 of the spool 130 along the longitudinal axis 168 to define a filter passage 170. Preferably the length of the filter passage 170, measured along the longitudinal axis 168, is as small as practical, such as between about 0.003 and about 0.005 inches. A second portion of the side wall 162 of the filter projects beyond an end face 175 of the spool 130 along the longitudinal axis 168 for a predetermined distance 176 toward the inlet port to define an offset portion 177 of the filter. The offset distance 176 can be any suitable distance which allows the formation of pressure gradients adjacent the filter entrance 160. Preferably the offset distance is between about 0.002 and about 0.005 inches.

The first and second section 51, 52 cooperate with the bore 132 of the spool to define a filtered fluid passage 172. The filtered fluid passage 172 is in communication with the cross holes 58, 59 of the filter 40. The mounting flange 48 and the shoulder 154 of the spool 130 cooperate together to provide a seal 180.

When the valve is in the closed position, as shown in FIG. 4, the spool 130 and the cage 124 are in overlapping relationship with each other along the longitudinal axis 168 and are disposed in such proximity to each other along the transverse axis 166 to provide a seal 181 which substantially prevents the flow from the main passage to the exit ports. An o-ring seal 183 and a back-up washer 184 are provided to seal the flow between the input port and the exit ports.

Operation of the valve 70 will now be described. The valve 70 is shown in FIG. 3 in the closed position with no current in the coil 82. The inlet port 126 is connected to a source of pressurized fluid. The fluid first enters the inlet port 126. The fluid travels through the filter 40, the orifice 140, and into the chamber 133. The fluid then travels through the bore 132 of the spool, through the pilot hole 99, and into the passageway 89 of the upper housing. The fluid acts against the tip 120 of the poppet 117 that is seated in the passageway 89 of the upper housing, causing the poppet 117 to move upward when force exerted by the pressurized fluid flowing from the inlet port 126 exceeds the spring force exerted by the spring 105. At that point, the poppet 117 moves upward, which in turn causes the rigid member 115 and the armature 86 to move up as well, thereby allowing the fluid to move from the pilot orifice 99 through the passageway 89 and out of the pilot tank connection 90. The upward movement of the armature 86 compresses the spring 105. The poppet 117 moves upward until the forces exerted by the pressurized fluid and the compressed spring 105 reach equilibrium. As the force exerted by the pressurized fluid increases. the poppet 117 moves up further and allows a greater volume of fluid to exit the pilot tank connection 90. This flow, also referred to as the "pilot flow," causes the fluid pressure in the passageway 89 and the chamber 133 of the spool to drop below the fluid pressure at the inlet port 126. The resulting differential pressure across the spool 130 produces an upward force on the spool 130. When this upward force is sufficient to overcome the resiliency of the spring 141, the spool 130 moves upward until communication is established between the inlet port 126 and the discharge port 127.

When a current is applied to the coil 82, a magnetic field is created that magnetizes the pole piece 85. If the current is sufficient, the resulting magnetic force causes the armature 86 to overcome the biasing force of the spring 105, moving toward the pole piece 85. The upward motion of the armature 86 causes the rigid member 115 to move up as well, thereby allowing pressure from fluid entering in the pilot orifice 99 to push the poppet 117 upward and allow the fluid to move from the pilot orifice 99 through the passageway 89 and out of the pilot tank connection 90. As the upward magnetic force increases, the armature 86 moves up further and allows a greater volume of fluid to exit the pilot tank connection 90.

Figure 5:
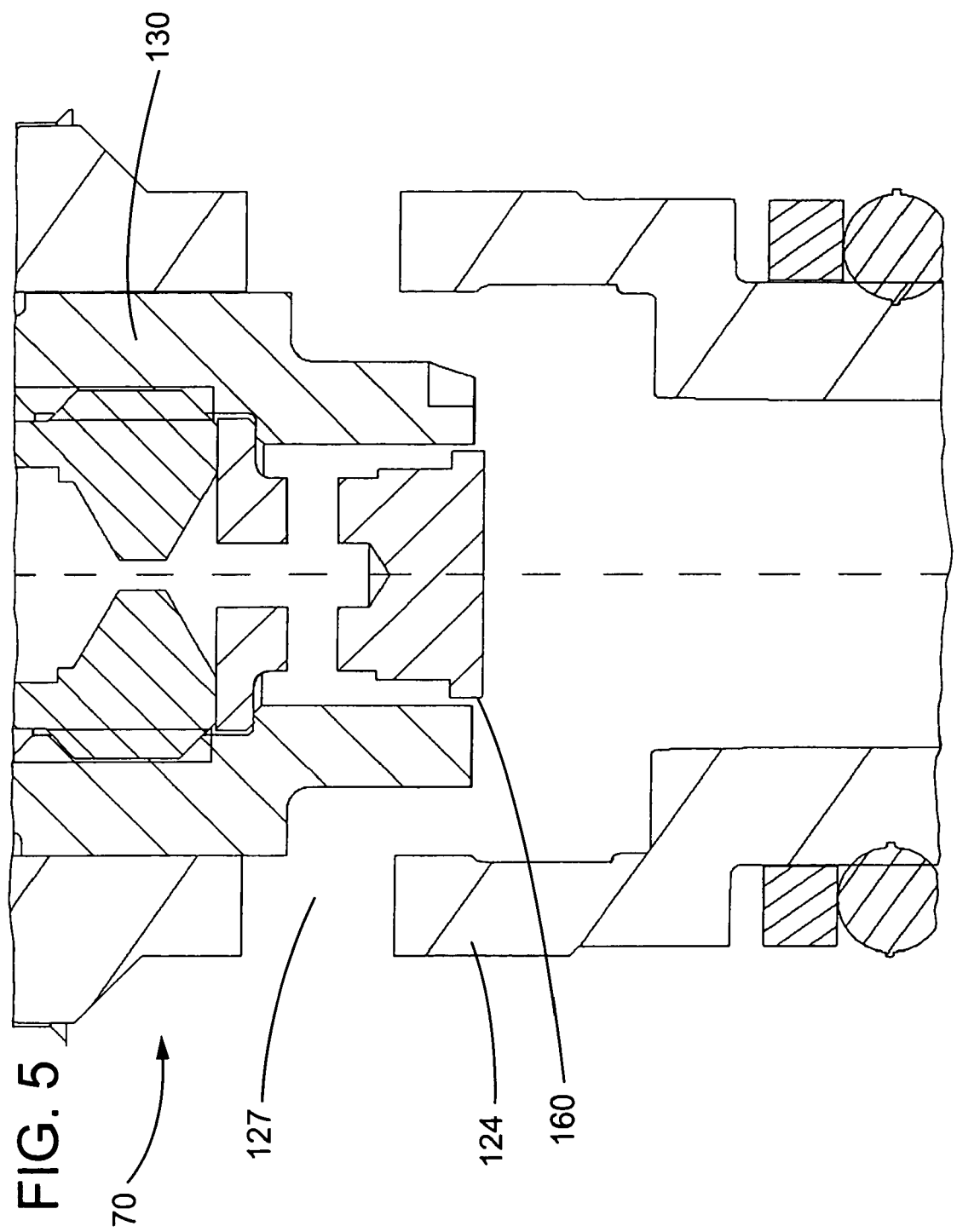
FIG. 5 is a view similar to FIG. 4, showing the valve of FIG. 3 in an open position.

Referring to FIG. 5, the valve 70 is in an open position. The discharge passage from the main flow through the discharge port is established. The spool 130 and the cage 124 have moved with respect to each other such that the seal therebetween is disengaged. The pilot flow can still move through the filter entrance 160 toward the orifice.

Figure 6:
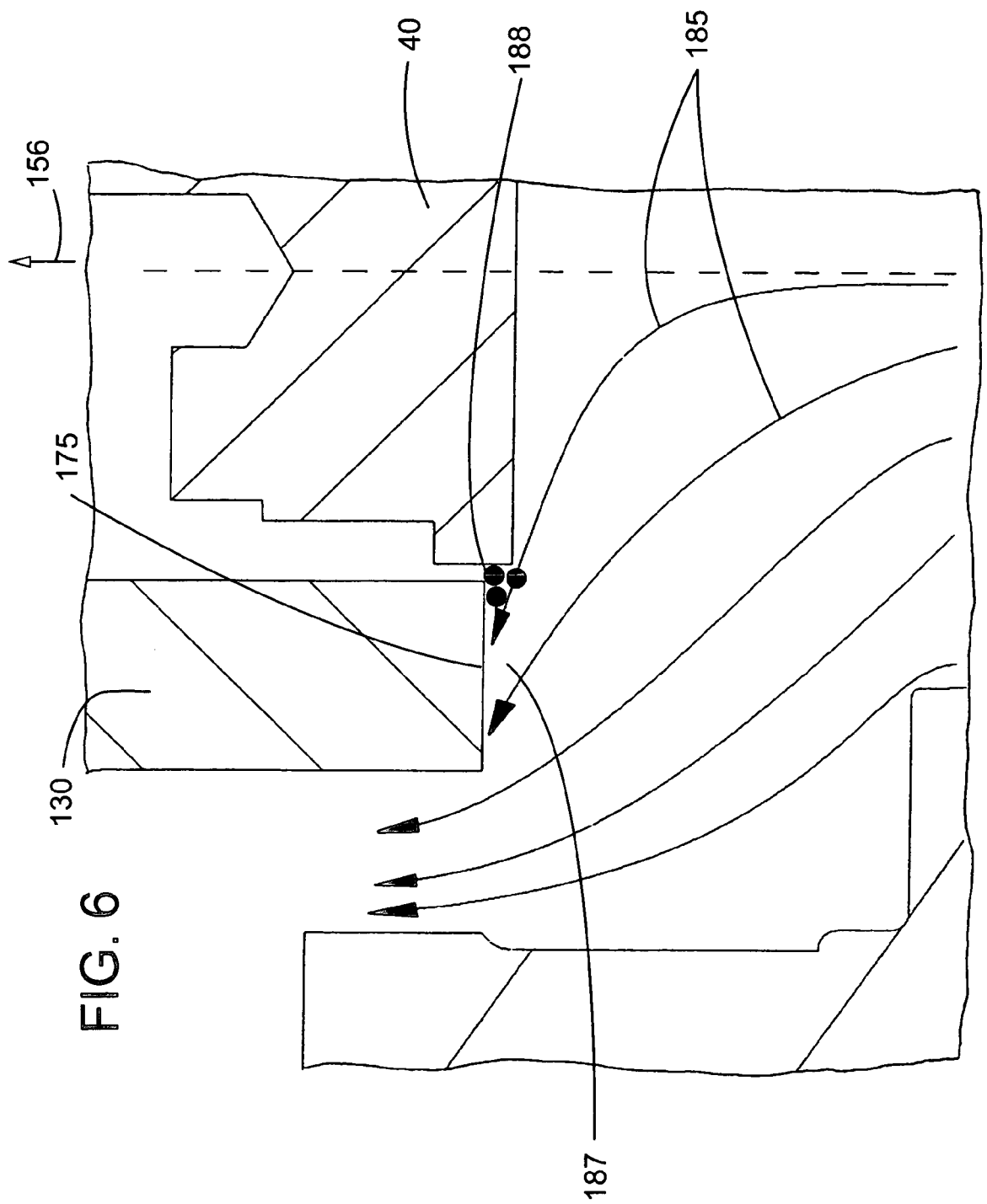
FIG. 6 is an enlarged detail view taken from FIG. 5 of the valve of FIG. 3, showing a discharge flow through the valve.

Referring to FIG. 6, the discharge flow 185 moves past the filter 40 and the end face of the spool 130 to move in a direction that is different than the direction of the pilot flow 156, which can be substantially perpendicular. The discharge flow can interact with the offset portion 177 of the filter to cause large pressure gradients to develop in an area 187 defined by the offset portion 177 where filtered contaminants can be stored. The pressure gradients urge the stored particles 188 into the discharge flow 185. The contaminants can be carried in the discharge flow out of the valve 70 where they can be trapped in the discharge line by a low-pressure main system filter, for example.

Figure 7:
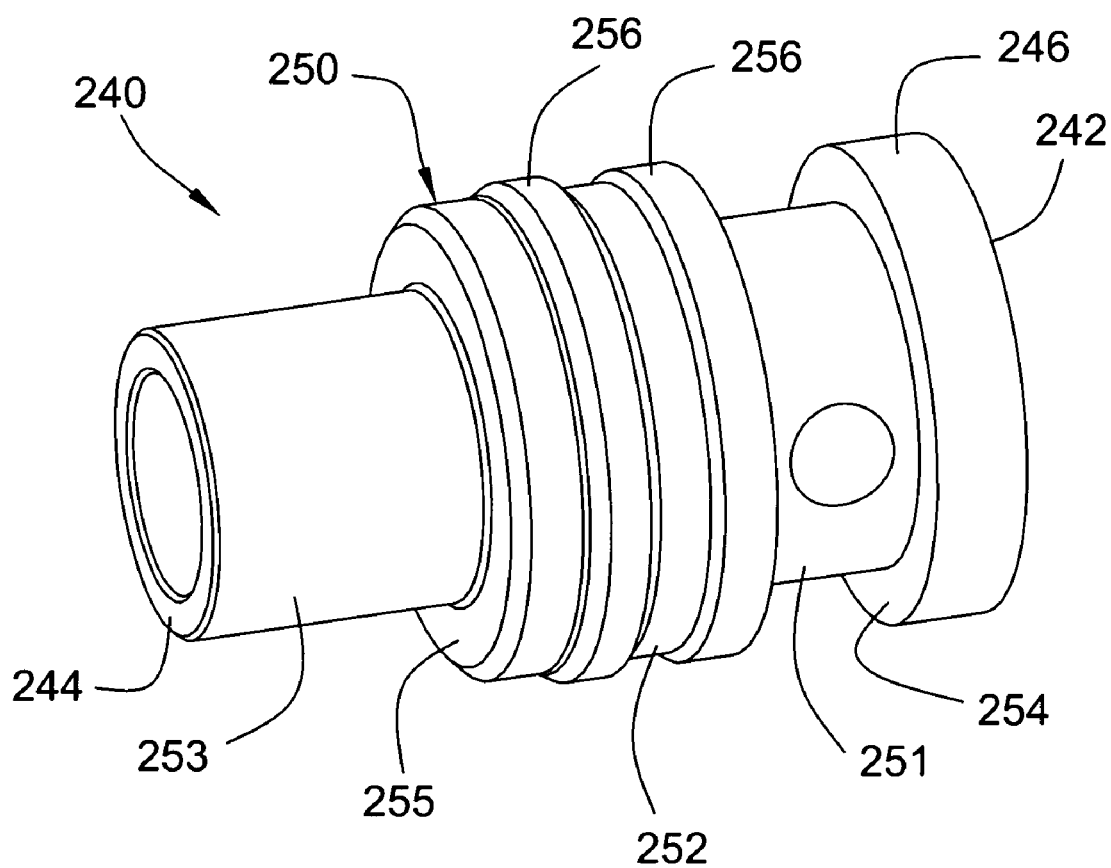
FIG. 7 is a perspective view of another embodiment of a filter according to the present invention.
Figure 8:
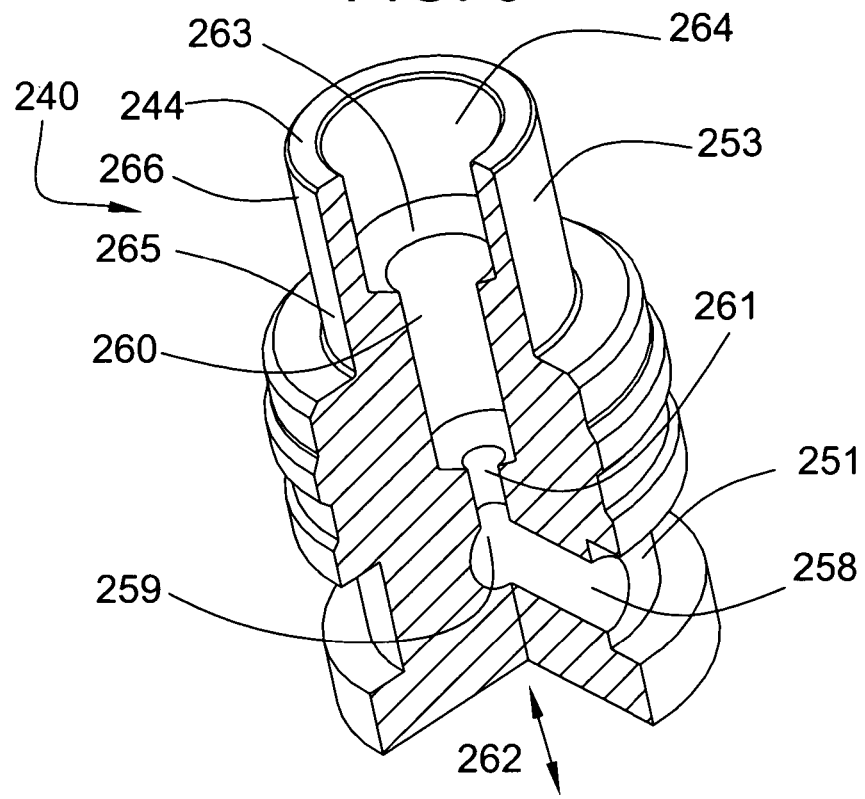
FIG. 8 is a perspective view, partially in section, of the filter of FIG. 7.
Figure 9:
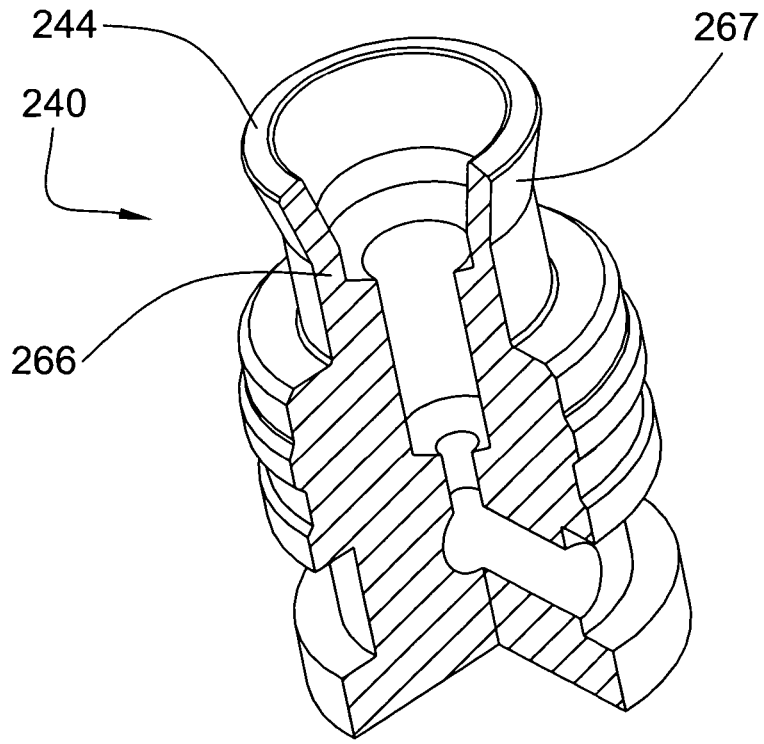
FIG. 9 is a view similar to FIG. 8, showing the filter of FIG. 7 after a flaring operation.

Referring to FIGS. 7–9, another embodiment of a filter 240 according to the present invention is shown. The filter 240 is generally cylindrical. Referring to FIG. 7, the filter 240 can include an entrance end 242 and an exit end 244 with the entrance end having an entrance head in the form of a passage flange 246, which is generally circular. Between the ends 242, 244 is a body portion 250 which includes three sections 251, 252, 253 that are generally cylindrical. Each section 251, 252, 253 can have a different size than at least one of the other sections. The passage flange 246 and the first section 251 define a first step 254, and the second section 252 and the third section 253 define a second step 255.

The second section 252 can include a plurality of seal rings 256 disposed around the outer surface thereof. The seal rings 256 can have a radius that substantially conforms to the radius of a bore in which the filter is intended to be disposed to provide a seal. The seal rings 256 can project radially beyond the perimeter of the passage flange 246.

Referring to FIG. 8, a pair of cross holes 258, 259 is disposed in the first section 251 and is in communication with an exit port 260 via an integral orifice 261 disposed between the cross holes 258, 259 and the exit port 260. The exit port 260 extends along a central axis 262 of the filter 240 for a predetermined distance from the orifice 261 toward the exit end 244. The exit port 260 opens to an end 263 of a chamber 264 defined by the interior of the third section 253. The cross holes 258, 259 are in opposing relationship with each other and both communicate with the orifice 261 and with each other. The orifice 261 is substantially aligned with the exit port 260, being substantially concentrically disposed with respect thereto. The cross holes 258, 259 are substantially perpendicular to the orifice and the exit port 260.

The third section 253 includes a first side wall portion 265 having a first thickness and a second side wall portion 266 having a second thickness. The first thickness is greater than the second thickness. The transition between the first and second side wall portions 265, 266 defines the end 263 of the chamber 264. The first and second side wall portions 265, 266 are generally cylindrical.

Referring to FIG. 9, a part 267 of the second side wall portion 266 has been enlarged by a flaring operation, for example. The flared part 267 is largest at the exit end 244 of the filter and gradually tapers toward the unflared part of the second side wall portion 266 to have a generally frustoconical shape.

Figure 10:
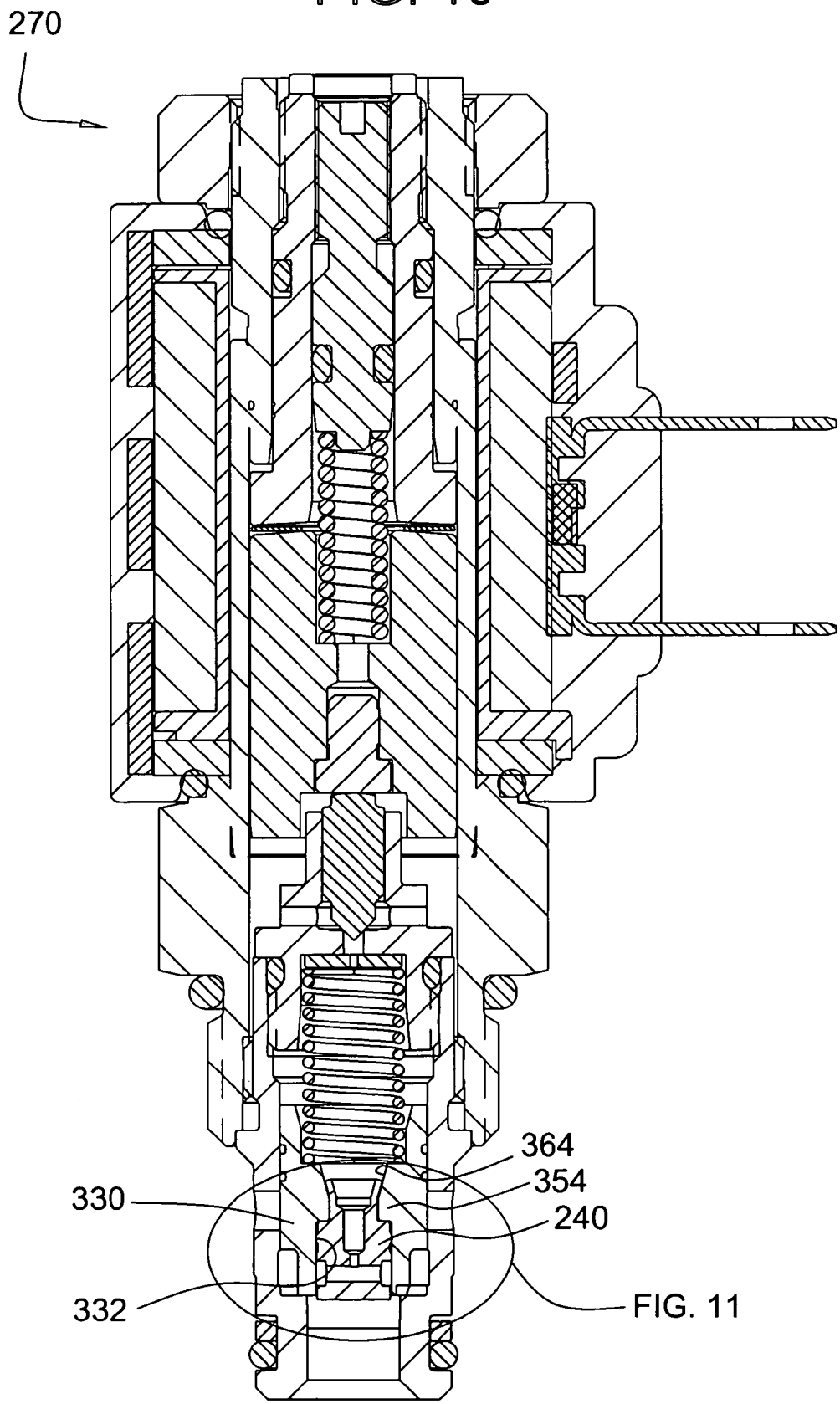
FIG. 10 is a sectional view of another embodiment of a valve according to the present invention, including the filter of FIG. 7.
Figure 11:
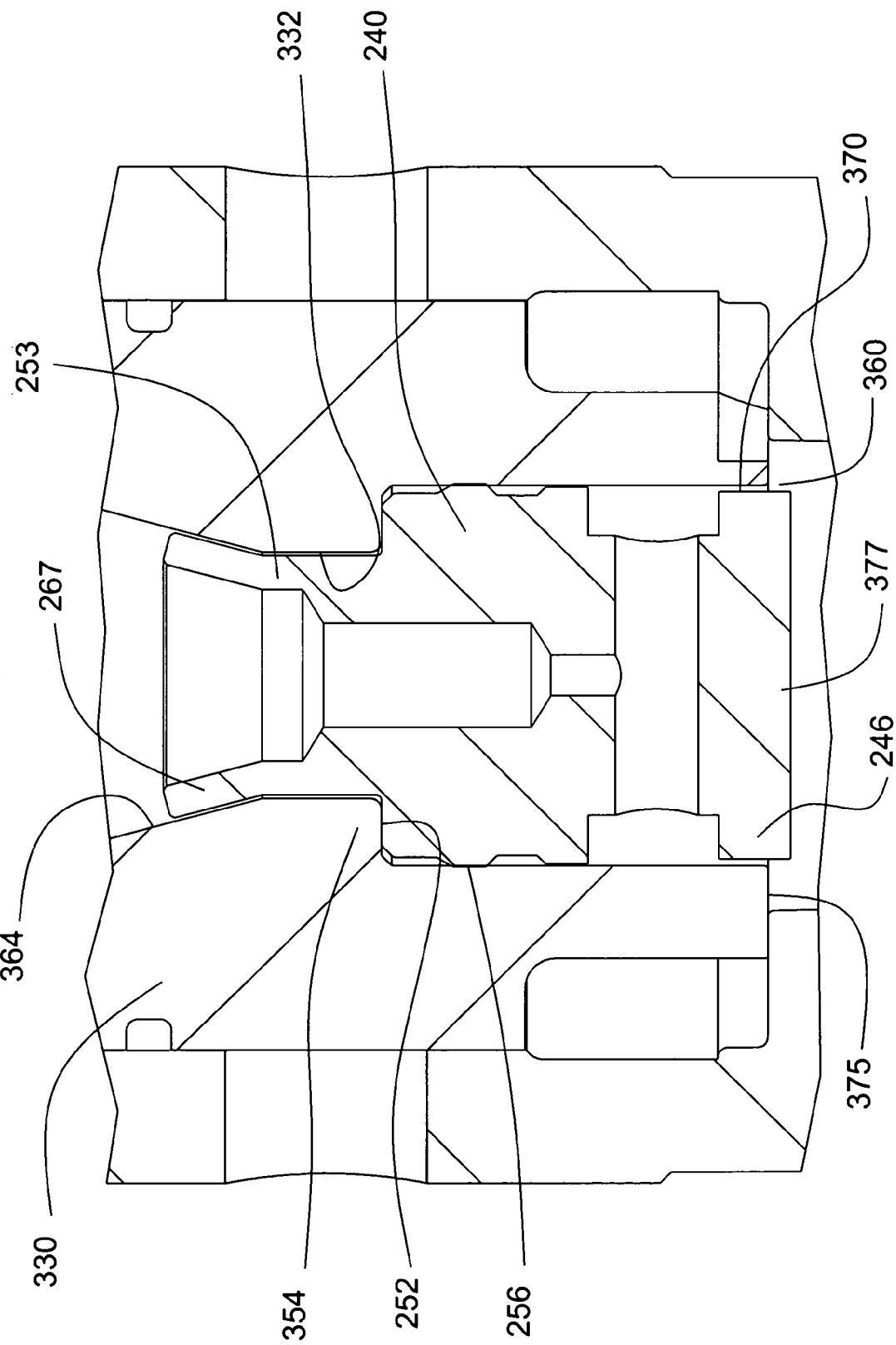
FIG. 11 is an enlarged detail view taken from FIG. 10 of the valve thereof.

Referring to FIGS. 10 and 11, another embodiment of a valve 270 according to the present invention is shown. The valve 270 includes the filter 240 of FIG. 7 retentively disposed in a bore 332 of a spool 330 thereof. The spool 330 includes a shoulder 354 and a tapered bore surface 364.

Referring to FIG. 11, the second step 252 of the filter 240 is in engagement with the shoulder 354 of the spool 330. To assemble the filter in the spool, the filter 240, with the third section 253 of the filter 240 in an unflared condition, as shown in FIG. 7, can be inserted into the bore 332 of the spool from an end face 375 thereof until the second step 252 of the filter engages the shoulder 354. The third section 253 can undergo a flaring operation from any suitable tool or device to create the flared part 267 of the filter, which can substantially conform to the tapered bore surface 364 of the spool. The flared part 267 and the second step 252 of the filter 240 cooperate with the tapered bore surface 364 and the shoulder 354 of the spool 330, respectively to retain the filter 240 in substantially fixed relationship with the spool 330.

The seal rings 256 of the filter 240 are in sealing engagement with the bore 332 of the spool 330 and help to dispose the filter 240 in substantially concentric relationship with the spool 330. The filter 240 and the spool 330 can be configured such that the passage flange 246 is disposed with respect to the spool 330 in a fashion similar to how the passage flange 46 of the filter 40 and the spool 130 of the valve 70 of FIG. 3 are disposed to define a filter entrance 360, a filter passage 370, and an offset portion 377.

The valve 270 of FIG. 10 can be similar in other respects to the valve of FIG. 3, as shown and described herein.

All references, including publications, patent applications, and patents, cited herein are hereby incorporated by reference The use of the terms "a" and "an" and "the" and similar referents in the context of describing the invention is to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended to illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter for a valve, the valve including a bore for receiving the filter and an orifice for accommodating a fluid flow therethrough, the filter comprising:

an entrance head, the entrance head configured to be in predetermined spaced relationship with the bore of the valve when disposed therein to define a filter entrance, the filter entrance being sized to prevent particles of a predetermined size from entering the filter entrance; and a body portion cooperating with the bore to define a fluid passage, the fluid passage having an exit port which is communicable with the orifice, wherein the body portion includes a cylindrical section disposed in opposing relationship to the entrance head, at least a portion of the cylindrical section being deformable such that the portion has a flared shape.

2. The filter according to claim 1 wherein the body portion includes a relief element for defining the fluid passage.

3. The filter according to claim 1 wherein the body portion includes a section that is generally polygonal and includes a plurality of rounded corners.

4. The filter according to claim 3 wherein the rounded corners each have a radius that substantially conforms to a radius of the bore of the valve.

5. The filter according to claim 1 wherein the body portion includes a seal ring.

6. The filter according to claim 1 wherein the body portion includes a first section at least a portion of which is smaller than the entrance head to define the fluid passage.

7. The filter according to claim 6 wherein the body portion includes a second section adjacent to the first section, the second section being smaller than the first section to define a step therebetween.

8. The filter according to claim 1 wherein the exit port is disposed in the body portion.

9. The filter according to claim 8 wherein the body portion includes a hole in communication with the exit port.

10. The filter according to claim 1 further comprising: a mounting flange.

11. The filter according to claim 1 wherein the body portion defines the orifice.

12. A valve comprising:
an input port for connection to a pressure source to develop a fluid flow;
a bore in communication with the input port;
an orifice for accommodating the fluid flow therethrough, the orifice disposed in the bore;
a filter disposed in the bore, the filter including an entrance head and a body portion, the entrance head in predetermined spaced relationship with the bore of the valve to define a filter entrance, the filter entrance being sized to prevent particles of a predetermined size in the fluid flow from entering the filter entrance, the body portion cooperating with the bore to define a fluid passage, and the fluid passage having an exit port which is communicable with the orifice; and
a spool, the spool defining the bore and including an end face;
wherein the filter is disposed in the bore such that a portion of the entrance head projects beyond the end face of the spool to define an offset portion of the filter.

13. The valve according to claim 12 further comprising: a cage, the cage defining a discharge port;
wherein the spool is movable to selectively open and close the discharge port, the discharge port when open being in communication with the input port to accommodate a discharge fluid flow, the discharge fluid flow interacting with the offset portion of the filter to develop a pressure gradient such that any particles trapped in the filter entrance are urged to move into the discharge fluid flow out of the valve through the discharge port.

14. The valve according to claim 12 wherein the valve comprises a two-stage valve.

15. The valve according to claim 14 further comprising: a retainer;
an actuator assembly including an actuator tube, a coil assembly, a pole piece, and an armature, the retainer mounted to the actuator tube, the actuator tube having a bore, the coil assembly mounted to the actuator tube, the pole piece retained within the bore of the actuator tube, and the armature movably disposed within the bore of the actuator tube, the armature including a rigid member;
a first housing, the first housing having a bore;
a poppet movably disposed within the bore of the first housing, the poppet in contacting relationship with the rigid member of the armature, the poppet having a head with a tip;
a passageway, the poppet being movable such that the tip of the poppet can be seated in the passageway;
a second housing having a bore;
a spool being movably disposed within the bore of the second housing.

16. The valve according to claim 12 wherein the orifice is disposed in an orifice insert, the orifice insert being disposed within the spool.

17. The valve according to claim 12 wherein the body portion of the filter includes a relief element for defining the fluid passage.

18. The valve according to claim 12 wherein the body portion of the filter includes a section that is generally polygonal and includes a plurality of rounded corners, the rounded corners each having a radius that substantially conforms to a radius of the bore, the rounded corners in contacting relationship with the bore.

19. The valve according to claim 12 wherein the body portion of the filter includes a seal ring disposed in sealing engagement with the bore.

20. The valve according to claim 12 wherein the body portion of the filter includes a first section at least a portion of which is smaller than the entrance head to define the fluid passage.

21. The valve according to claim 20 wherein the body portion of the filter includes a second section adjacent to the first section, the second section being smaller than the first section to define a step therebetween.

22. The valve according to claim 12 wherein the exit port is disposed in the body portion of the filter, and the body portion includes a hole in communication with the exit port.

23. The valve according to claim 16 wherein the filter includes a mounting flange, the spooi includes a shoulder, the mounting flange being disposed between the orifice insert and the shoulder of the spool to retain the filter.

24. The filter according to claim 12 wherein the body portion includes a flared part disposed in opposing relationship to the entrance head and a step, the spool includes a tapered bore surface and a shoulder, the flared part substantially conforming to the tapered bore surface, the flared part and the shoulder of the filter cooperating with the tapered bore surface and the shoulder of the spool, respectively, to retain the filter.

25. The valve according to claim 12 wherein the body portion of the filter defines the orifice.

26. A self-cleaning filter for a valve, the valve including a bore for receiving the filter and an orifice for accommodating a first fluid flow therethrough, the filter comprising:
an entrance head, the entrance head configured to be in predetermined spaced relationship with the bore of the valve when disposed therein to define a filter entrance, the filter entrance being sized to prevent particles of a predetermined size from entering the filter entrance, the entrance head being configured to project beyond an end of the bore to define an offset portion of the entrance head; and a body portion cooperating with the bore to define a fluid passage, the fluid passage having an exit port which is communicable with the orifice;

wherein when a second fluid flow, which moves in a direction different than the first fluid flow, acts upon the offset portion, a pressure gradient develops such that any particles trapped in the filter entrance are urged to move out of the filter entrance into the second fluid flow.

27. A valve comprising:

an input port for connection to a pressure source to develop a fluid flow;

a bore in communication with the input port, the bore including an end;

an orifice for accommodating a first fluid flow therethrough, the orifice disposed in fluid communication with the bore;

a filter, the filter disposed in the bore, the filter comprising:

an entrance head, the entrance head in predetermined spaced relationship with the bore to define a filter entrance therebetween, the filter entrance being sized to prevent particles of a predetermined size from entering the filter entrance, the entrance head projecting a predetermined distance beyond the end of the bore to define an offset portion of the entrance head; and a body portion cooperating with the bore to define a fluid passage, the fluid passage having an exit port which is communicable with the orifice;

wherein when a second fluid flow, which moves in a direction different than the first fluid flow, acts upon the offset portion of the entrance head, a pressure gradient develops at the filter entrance.

* * * * *